United States Patent
Brede et al.

(10) Patent No.: US 7,494,297 B2
(45) Date of Patent: Feb. 24, 2009

(54) JOINT FORMING DEVICES

(75) Inventors: Hans Brede, Sonoma, CA (US); Walter J. Zabriskie, Seattle, WA (US); Mark Baker, Buckinghamshire (GB); William Ernest Taylor Vallance, Buckinghamshire (GB)

(73) Assignee: Titus International PLC, Uxbridge (GB)

( * ) Notice: Subject to any disclaimer, the term of this patent is extended or adjusted under 35 U.S.C. 154(b) by 53 days.

(21) Appl. No.: 11/539,444

(22) Filed: Oct. 6, 2006

(65) Prior Publication Data

US 2007/0110512 A1 May 17, 2007

(30) Foreign Application Priority Data

Oct. 7, 2005 (GB) .................. 0520450.8

(51) Int. Cl.
*F16B 12/10* (2006.01)

(52) U.S. Cl. ................. 403/408.1; 403/231; 403/409.1; 403/DIG. 12

(58) Field of Classification Search ................. 403/294, 403/350, 408.1, DIG. 8, DIG. 10–DIG. 13; 411/392, 424, 426
See application file for complete search history.

(56) References Cited

U.S. PATENT DOCUMENTS

| | | | | |
|---|---|---|---|---|
| 3,252,495 | A | * | 5/1966 | Waltermire ................. 411/176 |
| 4,131,376 | A | * | 12/1978 | Busse ........................... 403/12 |
| 4,254,542 | A | * | 3/1981 | Craig ........................... 29/464 |
| 5,263,803 | A | * | 11/1993 | Anquetin ....................... 411/31 |
| 5,567,081 | A | * | 10/1996 | Vallance ..................... 403/292 |
| 6,238,128 | B1 | * | 5/2001 | Kaibach et al. ............. 403/297 |
| 6,276,867 | B1 | * | 8/2001 | Vallance .................. 403/409.1 |
| 6,276,868 | B1 | * | 8/2001 | Vallance .................. 403/409.1 |
| 6,866,455 | B2 | * | 3/2005 | Hasler ........................ 411/21 |

FOREIGN PATENT DOCUMENTS

GB  2305226  4/1997
GB  2335245  9/1999

* cited by examiner

*Primary Examiner*—Daniel P Stodola
*Assistant Examiner*—Joshua T Kennedy
(74) *Attorney, Agent, or Firm*—Alan Kamrath; Kamrath & Associates PA

(57) ABSTRACT

A fastening element for a joint forming device includes an elongate dowel and a sleeve for the dowel. The dowel has a head portion at one end thereof which is engagable in use with a tightening element. The dowel is adapted at the other end thereof to co-operate with the sleeve to cause radial expansion of an expandable end section of the sleeve upon relative axial movement between the sleeve and dowel. The expandable end section of the sleeve is insertable axially into a mounting hole in a first panel. The head of the dowel is insertable axially into a mounting hole in a second panel whereby to enable engagement with said tightening element. The sleeve is configured to allow the position of the dowel within its mounting hole in the second panel to be adjusted to enable insertion of the expandable end section of the sleeve into its mounting hole in the first panel, in use, even if the axes of the two mounting holes are out of axial alignment.

9 Claims, 2 Drawing Sheets

JOINT FORMING DEVICES

This invention relates to joint forming devices and in particular, though not exclusively, to such devices for use in the furniture industry.

Joint forming devices are used extensively in the flat-pack furniture industry for connecting panels together. Such panels are customarily pre-drilled with a standard pattern of holes for receiving the joint forming devices. Often, drilling jigs are used to drill a multiplicity of holes at once. With larger panels, this can sometimes lead to quite significant inaccuracies in hole positions. This in turn can make assembly of the panels into furniture problematic. The present invention aims to try and alleviate this problem.

The invention provides a fastening element for a joint forming device including an elongate dowel and a sleeve for the dowel. The dowel has a head portion at one end thereof which is engagable in use with a tightening element. The dowel is adapted at the other end thereof to co-operate with the sleeve to cause radial expansion of an expandable end section of the sleeve upon relative axial movement between the sleeve and dowel. The expandable end section of the sleeve is insertable axially into a mounting hole in a first panel. The head of the dowel is insertable axially into a mounting hole in a second panel whereby to enable engagement with said tightening element. The sleeve is configured to allow the position of the dowel within its mounting hole in the second panel to be adjusted to enable insertion of the expandable end section of the sleeve into its mounting hole in the first panel, in use, even if the axes of the two mounting holes are out of axial alignment.

Figure 1:
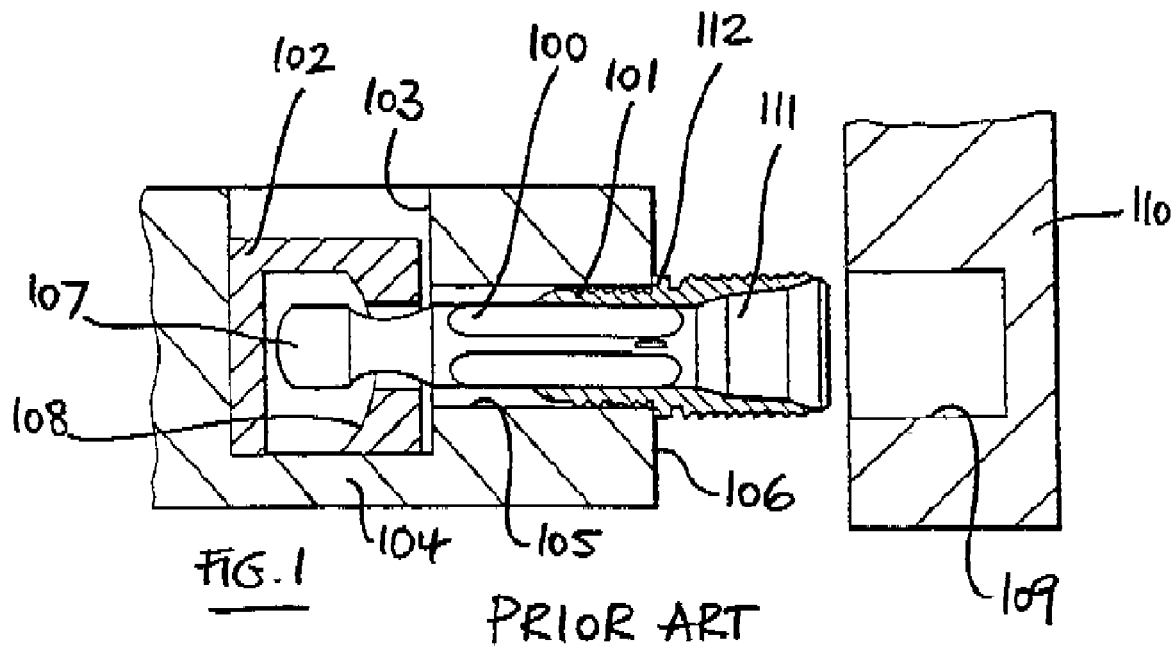
Figure 2:
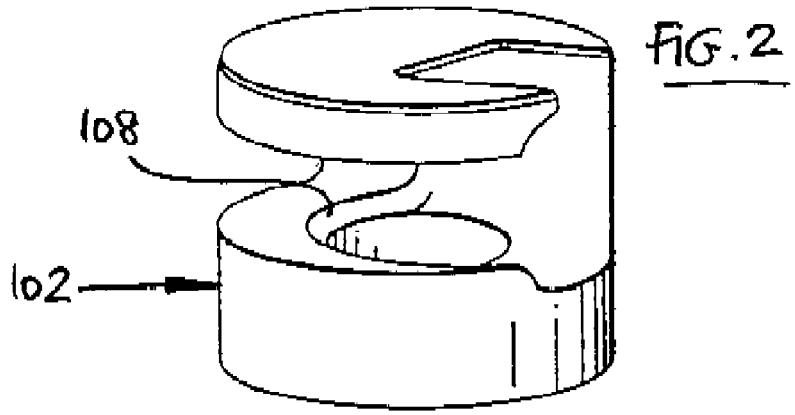
Figure 3:
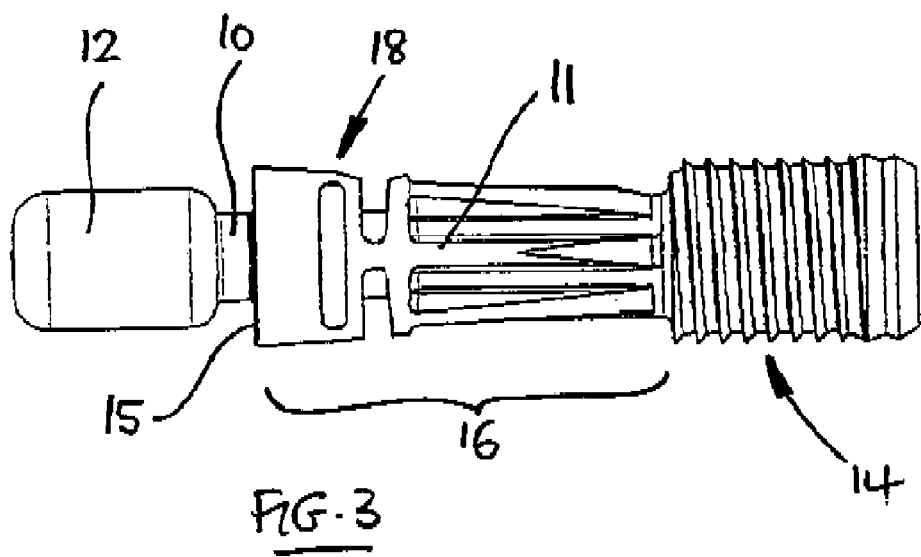
Figure 4:
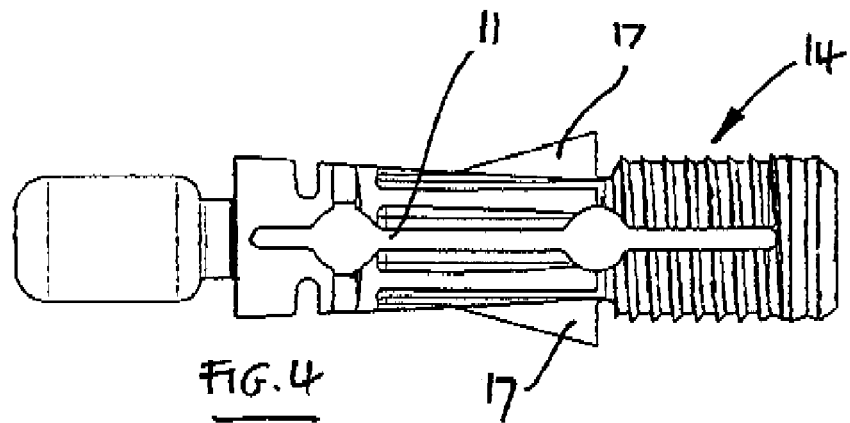
Figure 5:
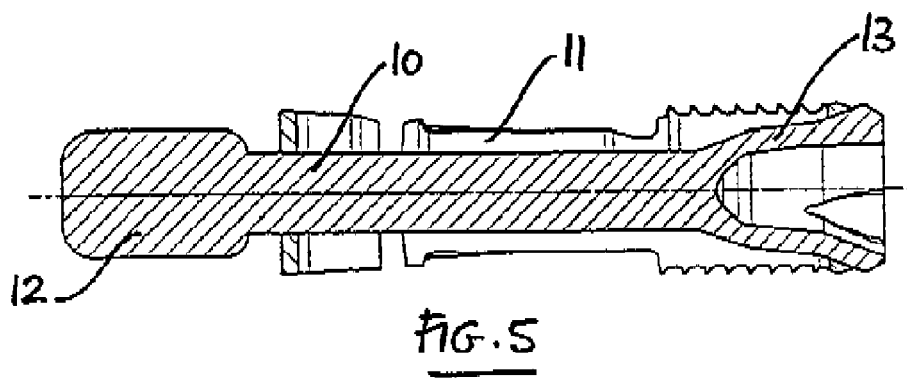
Figure 6:
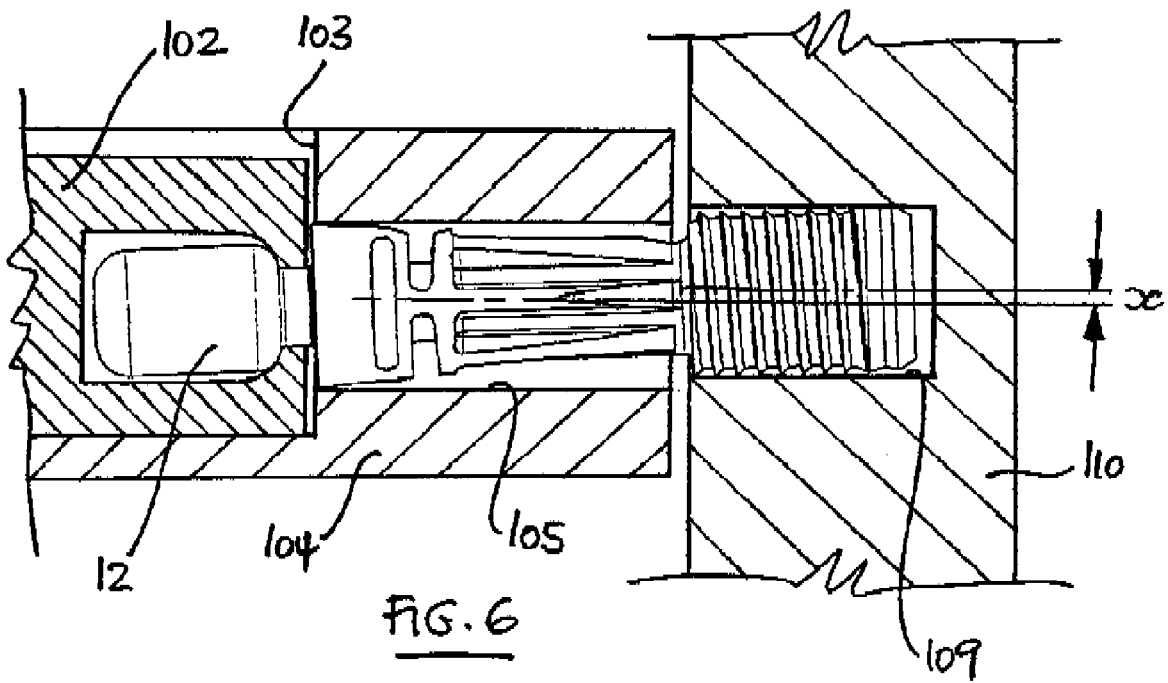

By way of example, an embodiment of the invention will now be described with reference to the accompanying drawings, in which:

FIGS. 1 and 2 illustrate a prior art joint forming device with a typical camming element, FIGS. 3 and 4 show a fastening element according to the present invention, FIG. 5 shows the fastening element in cross-section, and FIG. 6 shows the fastening element in use in a joint forming device.

FIG. 1 shows a prior art joint forming device according to earlier GB patent No. 2305226. The device comprises a fastening element in the form of a dowel 100 with a sleeve 101, and a tightening element in the form of a rotatable cam 102. The tightening element is rotatably mounted in a first hole 103 in the face of a first panel 104. A second, mounting hole 105 communicates between the first hole 103 and the edge 106 of the panel 104. One end of the fastening element is insertable into the second hole 105. At this end of the fastening element the dowel 100 has a head 107 which is able in use to engage camming surfaces 108 within the cam 102. The other end of the fastening element is insertable into a hole 109 in the face of a second panel 110. At this end of the fastening element, the dowel 100 has an outwardly flared end 111. The outwardly flared end 111 of the dowel 100 causes outward expansion of the sleeve 101 when the dowel is moved axially relative to it, thereby anchoring the end of the fastening element in its mounting hole 109 in the second panel 110. Movement of the fastening element is caused by the action of the camming surfaces 108 within the cam 102 engaging the head 107 of the dowel 100 when the cam is rotated. A collar 112 on the sleeve 101 abutting against the edge 106 of the first panel 104 acts as a reaction point to hold the sleeve 101 in a fixed position during pulling of the dowel 100.

An embodiment of a fastening element according to the present invention, shown in FIGS. 3, 4 and 5, also comprises a dowel 10 with a sleeve 11. The dowel 10 is of metal, and the sleeve 11 is of plastics material, conveniently formed around the dowel in a known process called insert moulding. At one end, the dowel 10 has a head 12 for engaging a tightening element, such as the cam 102 seen in FIG. 2. At its other end, the dowel 10 flares outwardly. In the preferred embodiment, the flared end 13 of the dowel 10 comprises a series of three tapering portions.

The sleeve 11 has a generally conical profile leading up to its expandable end section 14. This contrasts with the normally cylindrical profile of prior art sleeves. The conical profile extends filly between the end 15 of the sleeve 11 and its expandable end section 14 and is indicated by reference 16 in the drawings. The maximum outer diameter of the sleeve 11 is at its end 15 and this roughly equates to the bore size of the mounting hole 105 in the panel 104. At the narrowest point of the conical profile 16, adjacent the expandable end section 14, the sleeve is reduced to about 75% of its diameter at the end 15.

As seen in FIG. 6, the fastening element of the present invention is used in a similar manner to the prior art device. Typically, one end of the fastening element 12 is inserted into the mounting hole 105 in the first panel 104, so that the head of the dowel 10 can engage with the cam 102 rotatably mounted in its hole 103. The other end of the fastening element is then inserted into its mounting hole 109 in the second panel 110. Note, however, that the insertion of the fastening element into the panels can equally well be performed in the opposite order.

If there is any inaccuracy in the position in which the mounting holes 105 and 109 have been drilled in the two panels 104 and 110, they will not match up when the panels are brought together. In FIG. 6, such an axial misalignment is indicated by the offset x between the centre lines of the two holes 105 and 109. Misalignment such as this normally makes assembly of flat pack furniture very difficult and in some cases, impossible. Prior art fastening elements are only able to tolerate a relatively small amount of misalignment. The fastening element of the present invention, in contrast, is designed to have a far greater degree of tolerance.

The conical profile 16 of the sleeve 11 allows the fastening element some freedom of movement in order to be able to adjust its position within its mounting hole 105 in the panel 104. In particular, the fastening element can tilt so that its axis lies at an angle to the axis of its mounting hole 105. It can do this whilst the head 12 of the dowel 10 remains in engagement with the cam 102. The effect of such an adjustment will be to offset the protruding end of the fastening element, ie the expandable end section 14, relative to the axis of the mounting hole 105.

Prior art fastening elements are typically not expected to be able to tolerate inaccuracies in hole positionings of any more than about 0.5 mm. With the fastening element described above, it should be possible to increase the tolerance to nearly 2 mm of allowable inaccuracy.

It is important that the fastening element has some provisions to retain it in position in its hole 105 in the panel 104, for assembly and also possibly transit purposes. This is achieved in the preferred embodiment by a pair of fins 17 extending out from sleeve 11 adjacent to the expandable end section 14. The fins 17 are narrow in section and flexible. At pre-assembly, that is to say, before the two panels are brought together into engagement, the fins 17 are able to locate the sleeve 11 in its mounting hole 105 with sufficient grip to keep it there. However, the fins 17 are designed to flex and/or bite into the panel 104 in the event that the position of the fastening element has to be adjusted in order to take up a misalignment.

A further feature of the sleeve is that it has a resiliently collapsible region 18. This allows for a controlled reduction in the length of the sleeve when the fastening element is used in practice. This is needed to allow the panels to be brought up together (so as not to leave a gap between them) and then to put them under load so as to create a tight joint. This technology. is known from the earlier GB patent No. 2335245.

What is claimed is:

1. A fastening element for a joint forming device, comprising:
   an elongate dowel having a head at a first end and a flared portion at a second end;
   a sleeve for the dowel including a first expandable end having a first diameter and a second end having a second diameter, wherein the first and second diameters are substantially equal;
   wherein the dowel is located within the sleeve such that the head is located adjacent to the second end of the sleeve and is engagable with a tightening element and the dowel flared end cooperates with the expandable end to cause radial expansion of the diameter of the expandable end section upon relative axial movement between the sleeve and the dowel;
   wherein the diameter of the expandable end section of the sleeve prior to radial expansion is insertable perpendicularly to the diameter of the expandable end section and axially into a mounting hole in a first panel and the head of the dowel is insertable axially into a mounting hole in a second panel to enable engagement with said tightening element; and
   wherein the sleeve comprises a tapered portion extending from the second end and tapering to a point adjacent the expandable end to allow the fastening element to tilt within the mounting hole to increase positioning tolerances during insertion of the expandable end of the sleeve into the mounting hole in the first panel when the mounting holes are out of axial alignment.

2. A fastening element as claimed in claim 1 wherein the sleeve comprises means for retaining the fastening element in the mounting hole in the second panel in a pre-assembly condition, with the retaining means located intermediate the expandable end section and the other end of the sleeve.

3. A fastening element as claimed in claim 2 wherein said retaining means comprises one or more fins extending radially out from the sleeve to a radial extent greater than the diameters of the other end of the sleeve and of the expandable end section before radial expansion.

4. A fastening element as claimed in claim 3 wherein said fin or fins comprise a pair of diametrically opposite fins, wherein the fins are narrow in section and flexible to deflect and/or bite into the panel when the position of the fastening element in the mounting hole in the second panel is adjusted, with the pair of diametrically opposite fins tapering towards the other end of the sleeve.

5. A fastening element as claimed in claim 3 wherein said sleeve has a resiliently collapsible region to allow a controlled reduction in the length of the sleeve during use of the joint forming device, with the tapering portion located and extending between the resiliently collapsible region and the expandable end section.

6. A fastening element as claimed in claim 5 wherein said dowel has multiple taper portions at another end which are adapted to co-operate with said sleeve to cause said radial expansion thereof.

7. A fastening element as claimed in claim 1 wherein said dowel has multiple taper portions at another end which are adapted to co-operate with said sleeve to cause said radial expansion thereof.

8. A fastening element as claimed in claim 1 wherein said sleeve has a resiliently collapsible region to allow a controlled reduction in the length of the sleeve during use of the joint forming device, with the tapering portion located and extending between the resiliently collapsible region and the expandable end section.

9. A fastening element as claimed in claim 8 wherein said dowel has multiple taper portions at another end which are adapted to co-operate with said sleeve to cause said radial expansion thereof.

* * * * *